Figure 1:
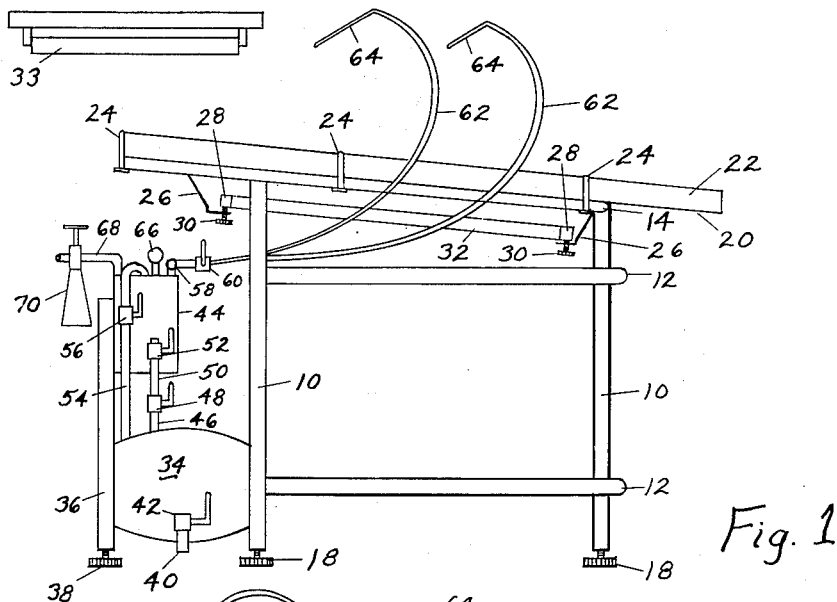

Aug. 21, 1956

L. H. LEHMAN 2,759,391

INSPECTION TABLE FOR LIGHT TRANSMITTING PRODUCTS

Filed Jan. 7, 1952

2 Sheets-Sheet 1

INVENTOR
Lewis H. Lehman

ATTORNEY

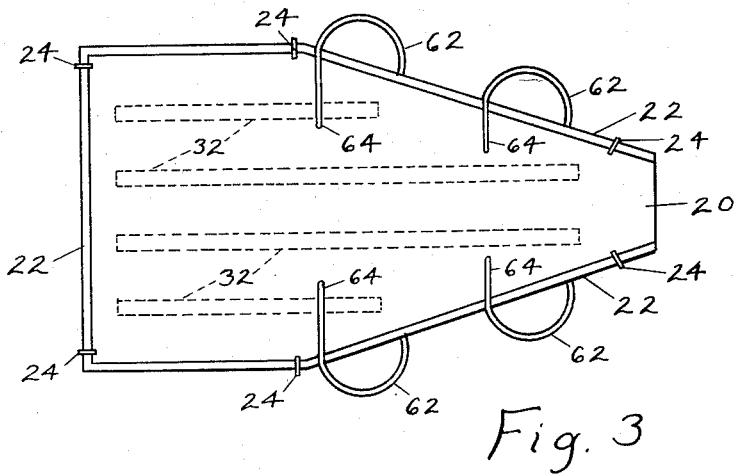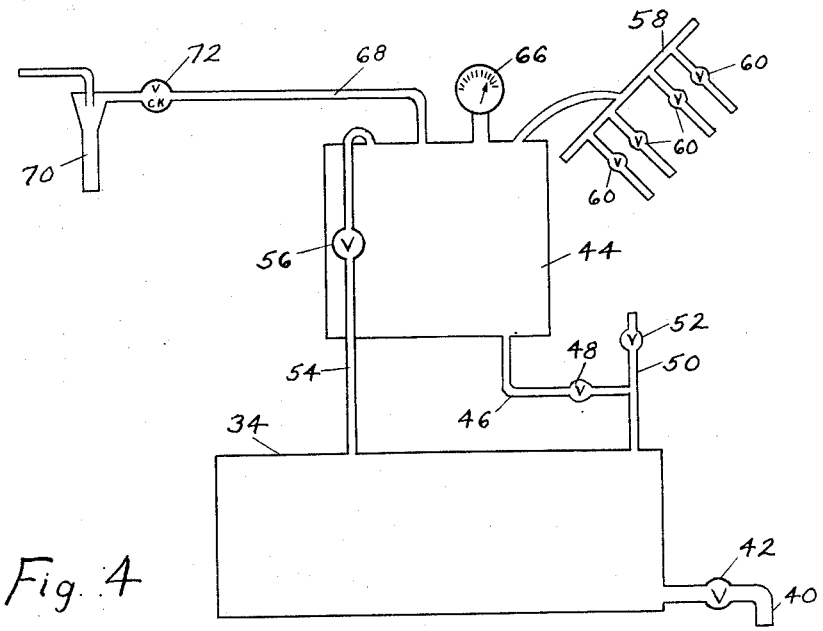

United States Patent Office 2,759,391
Patented Aug. 21, 1956

2,759,391

INSPECTION TABLE FOR LIGHT TRANSMITTING PRODUCTS

Lewis H. Lehman, Chicago, Ill., assignor to Productive Equipment Company, Chicago, Ill., a corporation of Illinois Application January 7, 1952, Serial No. 265,327

6 Claims. (Cl. 88—14)

This invention relates to improvements in inspection tables. More particularly, this invention relates to an improved inspection table which can be used with products which have components of varying light-transmissibility.

It is therefore an object of the present invention to provide an improved inspection table which can be used with products which have components of varying light-transmissibility.

In the processing of various products, as for example, food products, it is customary to pass the products along inspection tables and to remove objectionable parts of those products. In many instances the products are passed along inspection tables, and inspectors on opposite sides of the tables carefully examine the food products and use dippers or wire nets to lift out any objectionable parts of those products. These inspectors are able to remove many of the objectionable parts of the products, but they do not remove enough of those objectionable parts to provide sufficiently uniform food products. Moreover, those inspectors oftentimes remove parts of the food products which are not undesirable; such removal being due to the difficulty of distinguishing between the acceptable and the undesirable parts of some food products.

The present invention provides improved inspection of food products by employing trans-illumination of the food products as they pass along a plate of translucent material. The trans-illumination of the food products facilitates the more ready distinguishing of the acceptable portions of the food products from the undesired portions of the food products. In addition, the present invention trans-illumines the food products with light of a color that is complementary to the color of the food products; and the use of such light facilitates even more precise discrimination between the desired and the undesired components of the food products. This light does this by seemingly enhancing the variations in light-transmissibility of the components of the food products. It is therefore an object of the present invention to provide trans-illumination of food products by light of a color which is complementary to the color of the food products.

The present invention disposes a light source beneath one portion of the translucent inspection table provided by the present invention, and it disposes another light source above another portion of that table. The trans-illumination provided by the light source disposed below the inspection table seemingly enhances the variations in light-transmissibility of the components of the food products, and the flat illumination from the overhead light source facilitates the discernment of desired opaque components of those food products as against the undesired opaque components of those food products. By providing trans-illumination of those food products at another point, the present invention facilitates full and complete inspection of the food products. It is therefore an object of the present invention to provide a light source beneath one portion of a translucent inspection table and to provide overhead illumination of the food products at another portion of that inspection table.

In the inspection of food products, it is customary to remove undesired components of the food products with dippers and wire nets. The use of such dippers and wire nets frequently results in the removal of desirable as well as undesired components of the food products; the dippers and wire nets removing more than is needed because of the size of those dippers and nets. This is particularly true where the undesired components of the food products are very small; it being difficult to dip out just those small components. The present invention provides an improved method of removing undesired components of food products; the invention utilizing aspirators in doing so. The aspirators are connected to nozzles which are large enough to pass seeds, "hard spots," and like portions of food products; and those nozzles are mounted adjacent the inspection table. Consequently, it is easy for an inspector to place the end of the nozzle adjacent a seed, a "hard spot," or similar portion of the food products and cause that nozzle to neatly withdraw that seed, "hard spot," or like portion from the food products on the table. The nozzle can be placed immediately adjacent the undesired components of the food products and will withdraw just those components; the rest of the food products being undisturbed. It is therefore an object of the present invention to provide an inspection table with nozzles that are connected to an aspirator and that can withdraw undesired portions of the food products.

The aspirator used with an inspection table must be able to provide a continuous reduced pressure even though the nozzles accept seeds, "hard spots," and like portions of food products. The aspirator provided by the present invention is enabled to do this because it is connected to a pair of interconnected tanks. Whenever the lower of the two tanks becomes filled with seeds, "hard spots" and the like, valved passages between the tanks can be closed and the lower tank drained; the upper tank meanwhile receiving the additional seeds, "hard spots" and the like. Once the lower tank has been drained, the valve passages between the two tanks can be opened again. In this way, it is possible to attain a continuous reduced pressure despite the flow of seeds, "hard spots" and the like into the nozzles. It is therefore an object of the present invention to provide an inspection table with an aspirator connected to two interconnected tanks.

Other and further objects and advantages of the present invention should become apparent from an examination of the drawing and accompanying description.

In the drawing and accompanying description a preferred embodiment of the present invention is shown and described but it is to be understood that the drawing and accompanying description are for the purpose of illustration only and do not limit the invention and that the invention will be defined by the appended claims.

Figure 2:
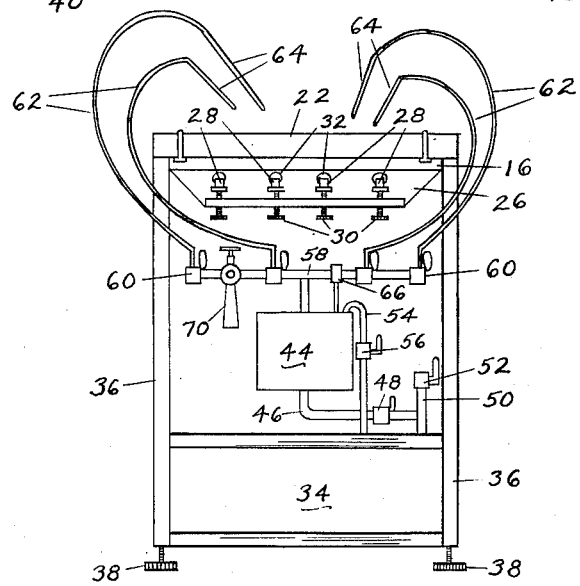

In the drawing, Fig. 1 is a side elevational view of an inspection table that is made in accordance with the principles and teachings of the present invention, Fig. 2 is an end elevational view of the inspection table shown in Fig. 1, Fig. 3 is a plan view of the translucent plate of the inspection table of Figs. 1 and 2, and it shows the nozzles and flexible tubes used with that transparent plate and Fig. 4 is a schematic diagram of the reduced pressure system used with the inspection table of Figs. 1 and 2.

Referring to the drawing in detail, the numeral 10 denotes the legs of an inspection table. The legs are four in number and they are vertically directed. The upper ends of the legs 10 are connected together by longerons 14 and cross bars 16. The longerons project outwardly to the left beyond the left hand legs of the table. Connecting braces 12 extend between the legs of the table and make the table rigid and sturdy. Feet 18 are provided for the legs 10, and those feet are secured to those legs by threaded projections on the feet. The threaded projections on the feet make it possible to adjust the vertical position of the legs 10 of the table.

The longerons 14 and the cross bars 16 provide a supporting surface for a translucent plate 20. This plate will be of heat resistant glass or plastic, and will preferably be of a translucent "Lucite." The plate 20 will pass light but will diffuse the light and provide a smooth distribution of light across its surfaces. Upstanding sides 22 are provided around three of the edges of the plate and those sides are formed integrally with the plate 20. Those sides will enable the plate to hold fluid and semi-fluid food products thereon. The right hand end of the plate 20 is open and will serve as a discharge opening for that plate. Removable clamps 24 will extend over the upper edges of the sides 22 of the plate 20 and will extend under the longerons 14 and the cross bars 16 respectively. These clamps facilitate the ready securement of the plate 20 to the table while also facilitating ready separation of that plate from that table for cleaning. This ready assembly and disassembly of plate and table is of the greatest importance in the food industry since complete sanitary operation is absolutely essential.

Hangers 26 extend downwardly from the longerons 14 and support adjusting screws 30 which carry mounting sockets 28 for tubular lamps. The adjusting screws 30 can be rotated relative to the hangers 26 to move the mounting sockets 28 upwardly or downwardly relative to the hangers 26. This makes it possible to move the tubular lamps 32, held by the sockets 28, toward and away from the plate 20 and to adjust the angle of those lamps relative to that plate. The adjusting screws 30 thus control the relative intensity and the angle of incidence of the light passing from the lamps 32 to the under side of the plate 20. The adjustment in the intensity of the light striking the under surface of the plate 20 is desirable since it makes possible the avoidance of eye fatigue for the inspectors who stand or sit adjacent the plate and examine food products flowing along that plate. The adjustment in the angle of incidence of the light striking the under side of the plate is desirable since changes in that angle of incidence can facilitate seeming enhancement of variations in the light-transmissibility of the components of the food products. The exact angle must be determined by experiment and will be determined by the color of the food products and the light emitted by the lamps 32.

The light emitted by the lamps 32 should be complementary to the color of the food products, since such a relation enables the light to enhance the variations in light-transmissibility of the components of the food products. For example, where the food products are predominantly red in color, the light from the lamps 32 should be green. In instances where the food products are tomato juice and pulp, green fluorescent tubes or mercury vapor lamps have been found quite useful.

The light from the lamps 32 trans-illuminates the plate 20 and the food products on that plate; and this trans-illumination is important because it enables the inspectors to discriminate precisely between skins which are relatively dense, pulp which is of intermediate density and the juice which is able to transmit a considerable degree of light. It would be impractical to separate the skins, the pulp and the juice by flat illumination alone. In addition, the trans-illumination enables the inspector to recognize scar tissue, "bad spots," "hard spots," and like portions of the food products. Under flat illumination, all of these components of the food products tend to appear similar and the ability of the inspector to discriminate between them is quite limited. With trans-illumination however, the inspectors can readily discriminate between these various components of the food products and can remove the undesired portion.

Trans-illumination of the food products will facilitate the removal of most of the undesired portions of those food products. However, trans-illumination is not fully helpful where the components are completely opaque. Accordingly, a light source 33 is disposed above another portion of the plate 20 and the flat illumination from that light source is used to high-light opaque components of the food products. For example, the flat illumination form the light source 33 will high-light black seeds and black specks and enable the inspector to discriminate between them. The provision of the trans-illumination of one portion of the plate 20 and the flat illumination of another portion of the plate 20 provide full and complete discrimination between the various desired and undesired components of the food products. The adjustment of the height of the legs 10, as by use of the feet 18 and the threaded projections thereon, is particularly desirable in connection with the overhead source of light 33. By adjusting the height of the legs 10 it is possible to adjust the angle at which the light from the source 33 strikes the food products on the plate 20. This is desirable since its permits an adjustment of that angle which best facilitates the discrimination between seeds and small specks.

For convenience in showing the invention, the light source 33 has been shown as being disposed above the translucent plate 20. If desired, the light source 33 could be disposed above an opaque portion of the inspection table or could be disposed above an opaque extension of that table.

This inspection table is particularly useful with products of fluid or semi-fluid consistencies. Examples of such food products are chilli sauce, stock for jams, jellies, preserves and the like. The legs 10 will preferably be dimensioned so the plate 20 is inclined downwardly from the left to the right. This will enable the fluid and semi-fluid food products to flow along the surface of the plate under the action of gravity. The exact inclination of the plate 20 can be adjusted by setting the feet 18 relative to the legs 10.

It would be possible to use dippers, spoons or dip nets to remove the undesired portions of the food products. However, spoons, dippers, and dip nets are objectionable because they frequently result in the removal of desired as well as undesired portions of the food products. The present invention minimizes the removal of desired food products as the undesired food products are being removed by providing a reduced pressure system which aspirates the undesired food products away from the desired food products. The reduced pressure system includes a tank 34 which is secured at its right hand side to the legs 10 which are adjacent the left hand end of the plate 20 and is secured at its left hand side to upstanding legs 36. The upstanding legs 36 are provided with feet 38 that have threaded projections thereon. The threaded projections on the feet 38 will enable the feet 38 to engage the ground solidly even though the feet 18 of the legs 10 are adjusted. In that way, all four of the feet 18 and the two feet 38 will rest upon the ground and provide solid supports for the table and its associated reduced pressure system. The tank 34 is provided with a discharge outlet 40 adjacent its lower end, and a valve 42 is disposed intermediate the discharge outlet 40 and the tank 34. When the valve 42 is open, the contents of the tank 34 can drain out, either into a suitable sewer connection or into a receptacle for waste products.

A tank 44, preferably a smaller tank than tank 34, is disposed above the level of the top of the tank 34. A valve passage 46, which contains a valve 48, extends between the bottom of the tank 44 and the top of the tank 34. This valve passage will conduct fluid contents from the tank 44 to the tank 34 whenever the valve 48 is open.

An inlet passage 50 communicates with the lower portion of the valve passage 46, at a point below the valve 48, and the inlet passage 50 has a valve 52 above the point of connection to the valve passage 46. When the valve 52 is open, air can flow through the inlet passage 50 into the top of the tank 34. A valve passage 54, which contains the valve 56, extends between the top of the tank 44 and top of the tank 34. This valve passage will, whenever the valve 56 is open, equalize the pressures in the tanks 34 and 44.

A header 58 is connected to the upper end of the tank 44 by suitable piping, and that header is connected to valves 60. The valves are spaced transversely of the inspection table and they are connected to flexible tubes 62 which can have their free end disposable above the translucent plate 20. Elongated nozzles 64 are secured to the free ends of the flexible tubes 62, and the ends of those nozzles have openings which are large enough to accept undesired components of food products. However, the nozzles 64 are made as small as possible in view of the size limitations imposed by the size of the food products to be drawn through the nozzle.

A pressure gauge 66 is secured to the top of the tank 44, and that pressure gauge will indicate the pressure within that tank. This pressure will be below atmospheric pressure because of the actions of the jet-type pressure reducing device 70 which is connected to the tank 44 by the passage 68. As shown schematically in Fig. 4, the pressure-reducing device 70 has a nozzle which is directed through a chamber of decreasing diameter. This nozzle will emit fluid, such as steam, at high velocities and will aspirate air from the passage 68 and the tank 44. A check valve 72 is provided in the passage 78 to insure against the high pressure fluid increasing the pressure in the tank 44. The pressure-reducing device 70 is of standard design and is preferably operated by steam because steam is usually available in food processing plants.

The passage of steam through the pressure reducing device 70 creates a reduced pressure in the tank 44 and whenever the valve 56 is open and the valves 52 and 42 are closed, that reduced pressure will be maintained in the tank 34. This reduced pressure will also be maintained in the header 58 and in the flexible tube 64. This reduced pressure will enable air to be drawn in through the nozzles 64 and will enable undesired components of the food products to be drawn through those nozzles when those nozzles are placed in the food products.

The inspectors will place the nozzles 64 immediately adjacent undesired components of the food products and will hold those nozzles adjacent those undesired components of the food products just long enough for the nozzles to receive those components. Thereafter, the nozzles will be raised away from the table and held away from the food products on the table until the inspector sees another undesired component of the food product. The undesired food products which pass into the nozzle 64 will be drawn to the flexible tube 62, through the valves 60, through the header 58 into the tank 44. Under normal conditions, the valve 48 in the passage 46 will be opened, and the food products will then flow into the tank 34. After the inspection table has been used for several hours, the tank 34 will tend to fill up with the undesired food products. It is then a simple matter to close the valves 48 and 56 and to open the valves 42 and 52. Thereupon the food products will flow into and be held by the tank 44 while the original food products will drain out of the tank 34 through the valve discharge outlet 40; the air inlet 50 providing a full supply of air to facilitate ready draining of the tank 34. Once the tank 34 has drained, the valves 42 and 52 will be closed and then the valves 48 and 56 open once again. The food products which had accumulated in the tank in the meanwhile will promptly drain into the tank 34 and all additional food products will drain into the tank 34 until the valves 48 and 56 are again closed for drainage of the tank 34.

The valves 60 are provided to facilitate the regulation of the flow through the nozzles 64 and the flexible tube 62. The exact rate of flow will be determined by the size of the food products and the size of anticipated undesired components in those food products. It is desirable to adjust the valves 60 to provide as small a flow as possible without leading to clogging of the nozzles 54 and hoses 62, because the smaller the flow the lower the pressure that can be maintained in the tanks 34 and 44.

The light which is provided by the light source 33 should be a composite of the colors of the food products and of the light from the light source as 32. Where the food products are predominantly red and the light from the lamps 32 is green, the light from the source 33 should be white. Such a combination of complementary colors for the food products and the light passing upwardly through the plate 20 and a composite color directed onto the food products from above has been found to facilitate precise discrimination between the undesired components and the desired components of food products. In addition, the use of trans-illumination of the food products at one point and the flat illumination of those food products at another point has been found to materially reduce the eye strain and fatigue of the inspectors.

Whereas a preferred embodiment of the present invention has been shown and described in the drawing and accompanying description it should be apparent to those skilled in the art that various changes may be made in the form of the invention without affecting the scope thereof.

What I claim is:

1. An inspection table for products, which have components of varying light-transmissibility, which comprises a generally horizontal translucent plate that has one end higher than the other to cause free, gravity-induced flow of said products from said higher end to said other end, a source of light disposed below said plate, said source of light providing trans-illumination of said plate and the products thereon throughout the greater part of the length of said plate, the light from said source of light having a color which is complementary to the color of said products to seemingly enhance the variations in light-transmissibility of said components of said products, and a source of light above said plate and above the products thereon for illuminating a limited area of said plate to high-light opaque portions of said products, the light from the second said source of light being a composite of the colors of said products and the light from the first said source of light.

2. An inspection table for products, which have components of varying light-transmissibility, which comprises a translucent plate and a source of light disposed below said plate, said source of light providing trans-illumination of said plate and the products thereon, the light from said source of light having a color which is complementary to the color of said products to seemingly enhance the variations in light-transmissibility of said components of said products, a second source of light above said table, the light from said second source of light being a composite of the colors of said products and the light from the first said source of light, said sources of light being spaced along the length of said plate and directing their light onto longitudinally spaced areas of said plate.

3. An inspection table for products, which have components of varying light-transmissibility and color, which comprises an inclined plate of translucent material, upstanding sides on said plate that confine said products, an open end for said plate at the lower end thereof that permits discharge of said products, a source of light disposed below said plate, a support for said source of light, adjustable legs for said table, said source of light providing trans-illumination of said plate and the products thereon to facilitate the inspection of said products, the light from said source of light having a color which is complementary to the color of said products to seemingly enhance the variations in light-transmissibility of said components of said products, said support being selectively adjustable for moving said light source relative to said plate, whereby the intensity and angle of incidence of light striking said plate can be adjusted, said legs of said table being adjustable to vary the angle of said plate and direction of light passing through said table, and a source of light above said plate and the products thereon, the adjustability of said legs and of the first said light source interrelating the intensity and direction of light at the lower surface of said table with the direction of light from said source of light above said table to high-light the variations in light transmissibility of said products.

4. An inspection table for fluid products, which are predominantly red in color, that comprises an inclined plate of translucent "lucite," upstanding sides on said plate that confine said fluid products, an open end for said plate at the lower end thereof that permits discharge of said fluid products, a source of green light disposed below said plate, said source of light providing trans-illumination of said plate and the fluid products thereon to facilitate the inspection of said fluid products, the green light from said source of light reacting with the red color of said fluid products to seemingly enhance the variations in light-transmissibility of said components of said fluid products, and a source of white light above said plate, said white light being directed toward an area of said table that is spaced from the trans-illuminated area of said plate, said white light high-lighting opaque components of said fluid products.

5. An inspection table for fluid products, which are predominantly red in color and which have components of varying light-transmissibility, that comprises a plate of translucent "lucite," upstanding sides on said plate that confine said fluid products, an open end for said plate that permits discharge of said fluid products, a source of green light disposed below said plate, said source of light providing trans-illumination of said plate and the fluid products thereon to facilitate the inspection of said fluid products, the green light from said source of light reacting with the red color of said fluid products to seemingly enhance the variations in light-transmissibility of said components of said fluid products, and an adjustable mounting for said source of green light for moving said source of green light toward and away from said table and for changing the angle of incidence of the green light on said table, thereby varying the brightness and direction of said green light at said table.

6. An inspection table for fluid products, which are predominantly red in color, that comprises a plate of translucent "lucite," upstanding sides on said plate that confine said fluid products, an open end for said plate that permits discharge of said fluid products, a source of green light disposed below said plate, said source of light providing trans-illumination of said plate and the fluid products thereon to facilitate the inspection of said fluid products, the green light from said source of light reacting with the red color of said fluid products to seemingly enhance the variations in light-transmissibility of said components of said fluid products, and a source of white light above said plate, said sources of light being spaced along the length of said plate and directing their light onto longitudinally spaced areas of said plate.

References Cited in the file of this patent

UNITED STATES PATENTS

| Number | Name | Date |
|---|---|---|
| 1,015,730 | Gill | Jan. 23, 1912 |
| 1,143,675 | Whitney | June 22, 1915 |
| 1,900,633 | Buchner | Mar. 7, 1933 |
| 1,902,659 | Muller-Clemm | Mar. 21, 1933 |
| 1,974,522 | Twyman et al. | Sept. 25, 1934 |
| 2,099,012 | Goodrich et al. | Nov. 16, 1937 |
| 2,247,211 | Solk | June 24, 1941 |
| 2,308,190 | Magnuson | Jan. 12, 1943 |
| 2,308,365 | Hornbrook | Jan. 12, 1943 |
| 2,434,345 | Boylan | Jan. 13, 1948 |
| 2,436,082 | Stout | Feb. 17, 1948 |
| 2,476,425 | McLeary | July 19, 1949 |
| 2,481,567 | Brown | Sept. 13, 1949 |